(12) United States Patent
Okayama et al.

(10) Patent No.: US 6,835,356 B2
(45) Date of Patent: Dec. 28, 2004

(54) OZONE PURIFYING APPARATUS FOR VEHICLE

(75) Inventors: Tatsuya Okayama, Wako (JP); Atsushi Arisaka, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 845 days.

(21) Appl. No.: 09/796,551

(22) Filed: Mar. 2, 2001

(65) Prior Publication Data

US 2001/0019707 A1 Sep. 6, 2001

(30) Foreign Application Priority Data

Mar. 3, 2000 (JP) .......................... 2000-058808
Jun. 7, 2000 (JP) .......................... 2000-170248

(51) Int. Cl.[7] .......................... B01D 50/00; B01D 53/34
(52) U.S. Cl. .......................... 422/177; 422/181
(58) Field of Search .......................... 422/177, 181, 422/168, 186.07

(56) References Cited

U.S. PATENT DOCUMENTS

| | | | | |
|---|---|---|---|---|
| 5,167,927 A | * | 12/1992 | Karlson | 422/90 |
| 5,954,040 A | * | 9/1999 | Riedel | 123/703 |
| 5,997,831 A | * | 12/1999 | Dettling et al. | 423/219 |
| 6,112,520 A | * | 9/2000 | Kaiho et al. | 60/303 |

FOREIGN PATENT DOCUMENTS

| | | |
|---|---|---|
| JP | 5-317717 | 12/1993 |
| JP | 6-82409 | 3/1994 |
| JP | 11-507289 | 6/1999 |

* cited by examiner

*Primary Examiner*—M. Alexandra Elve
(74) *Attorney, Agent, or Firm*—Arent Fox PLLC

(57) ABSTRACT

An ozone purifying apparatus for a vehicle having a radiator. Ozone purifying catalysts are spread on the surface of the radiator. The amount of adhered matter adhering to the ozone purifying catalysts is estimated and the operating state of the ozone purifying catalysts is diagnosed according to the estimated amount of adhered matter.

20 Claims, 16 Drawing Sheets

FIG. 10
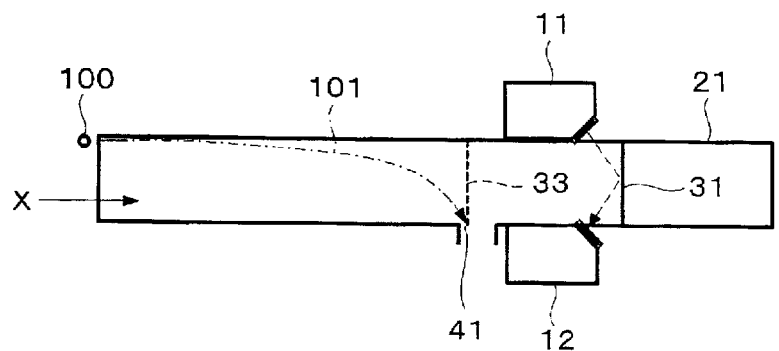
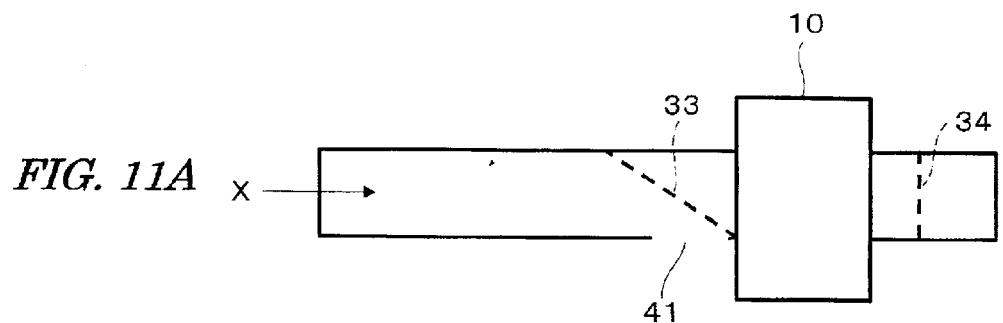
FIG. 11A
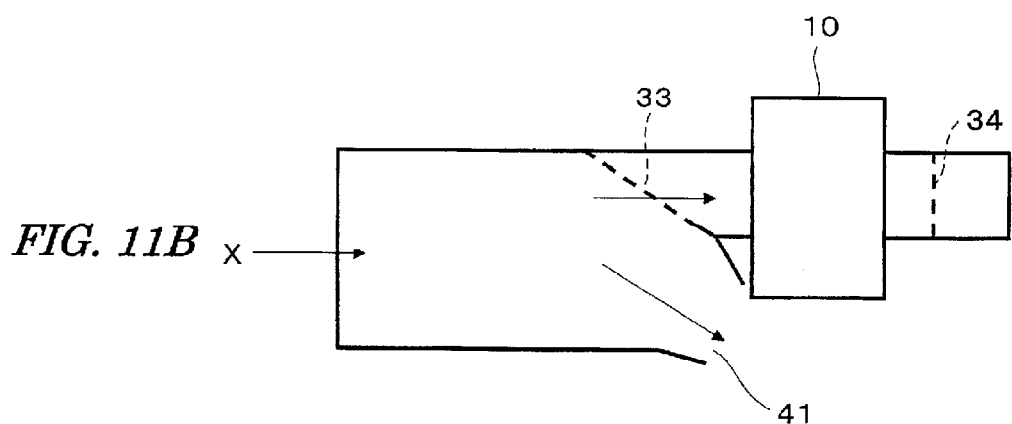
FIG. 11B
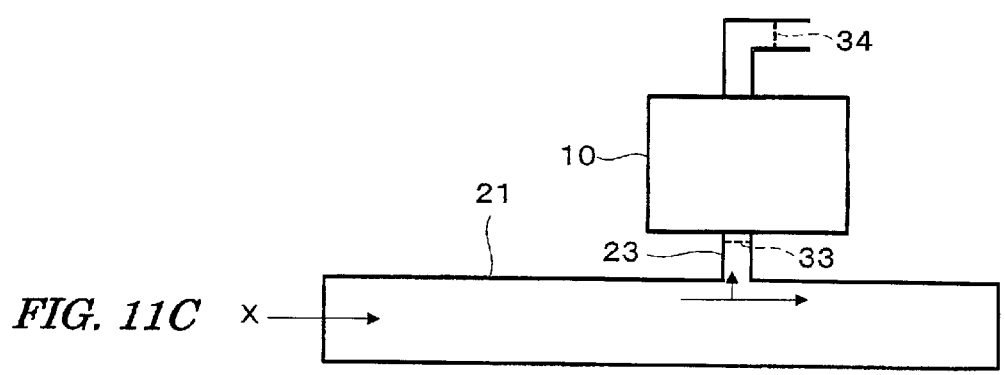
FIG. 11C

OZONE PURIFYING APPARATUS FOR VEHICLE

BACKGROUND OF THE INVENTION

The present invention relates to an ozone purifying apparatus for purifying ozone ($O_3$) in atmospheric air, and particularly to an ozone purifying apparatus mounted on a vehicle.

When a vehicle is running, air flows across the surface of a vehicular body or across the surface of a radiator mounted in the vehicle. As such, an ozone purifying apparatus has been proposed including ozone purifying catalysts spread on the surface of the vehicular body or the surface of the radiator, thereby purifying ozone in atmospheric air. For example, Japanese Patent Publication (Published Translation of PCT application) No. Hei 11-507289 corresponding to International Publication No. WO96/22150. The ozone purifying apparatus is intended to suppress the occurrence of photochemical smog by purifying ozone in atmospheric air.

The above-mentioned ozone purifying apparatus however, has disadvantages. For example, if extraneous matter such as dust particles having a size on the order of several micrometers adheres to the surface of the ozone purifying apparatus, the particles may permeate and thereby clog a catalyst layer, obstructing the diffusion of ozone in the catalyst layer or reducing an amount of ozone coming into contact with the catalysts. Accordingly, the amount of ozone purified by the catalysts is reduced and the purifying ability of the ozone purifying apparatus is degraded.

Another disadvantage is that the purifying ability of the ozone purifying apparatus may be degraded by sulfur oxide ($SO_x$) or the like in atmospheric air.

SUMMARY OF THE INVENTION

An object of the present invention is to provide an ozone purifying apparatus capable of detecting the degradation of ozone purifying means, such as ozone purifying catalysts, due to various causes, for example, the degradation due to adhesion of extraneous matter or the degradation due to $SO_x$.

To achieve the above object, there is provided an ozone purifying apparatus for a vehicle, comprising: heat radiating means provided on the vehicle; ozone purifying means carried on the surface of the heat radiating means; estimating means for estimating an amount of adhered matter adhering on the ozone purifying means; and diagnosing means for diagnosing the operating state of the ozone purifying means according to an output from the estimating means.

With this configuration, an amount of adhered matter adhering to the ozone purifying means is estimated and the operating state of the ozone purifying means is diagnosed according to the estimated amount of the adhered matter. Therefore, it is possible to diagnose an adhesion state of adhered matter such as dust on the ozone purifying means and hence to detect degradation of a purifying characteristic of the ozone purifying means, and to give a warning to the driver of the vehicle.

According to a second aspect of the present invention, there is provided an ozone purifying apparatus for a vehicle, comprising: heat radiating means provided on the vehicle; ozone purifying means carried on the surface of the heat radiating means; airflow detecting means for detecting an amount of airflow passing through the heat radiating means; and diagnosing means for diagnosing the operating state of the ozone purifying means according to an output of the airflow detecting means.

With this configuration, an amount of airflow passing through the heat radiating means is detected and the operating state of the ozone purifying means is diagnosed according to the detected amount of airflow. Therefore, it is possible to diagnose an adhesion state of adhered matter such as dust on the ozone purifying means and hence to detect the degradation of the purifying characteristic of the ozone purifying means, and to give a warning to the driver of the vehicle.

The estimating means preferably includes at least one of a contamination measuring plate allowing light to pass therethrough and a contamination measuring plate allowing light to be reflected therefrom, the at least one of contamination measuring plates being disposed in the vicinity of the heat radiating means; a light emitting means for irradiating the at least one of a contamination measuring plate with light; and a light receiving means for detecting a quantity of light passing through or being reflected from the at least one of a contamination measuring plate.

The estimating means preferably includes an air passage disposed in the vicinity of the heat radiating means; a filter allowing air and light to pass therethrough and catching dust particles of a size which is greater than or equal to a predetermined size, the filter being disposed in the air passage; a light emitting means for irradiating the filter with light; and a light receiving means for detecting a quantity of light passing through or being reflected from the filter.

The estimating means preferably includes an air passage disposed in the vicinity of the heat radiating means; a filter allowing air or light to pass therethrough and catching dust particles of a size which is greater than or equal to a predetermined size, the filter being disposed in the air passage; and pressure sensors provided on the upstream side and the downstream side of the filter.

The ozone purifying apparatus preferably includes means for detecting a vehicle speed, and the diagnosing means corrects a pressure detected by each of the pressure sensors according to the detected vehicle speed, and diagnoses the operating state of the ozone purifying means based on the corrected pressure.

The air passage is preferably configured such that no external light reaches the light emitting means and the light receiving means.

The diagnosing means preferably determines that a purifying characteristic of the purifying means is degraded when the light quantity detected by the light receiving means decreases to a predetermined threshold value or less, and gives a warning.

The airflow detecting means is preferably a wind velocity sensor provided in front of or at the back of the heat radiating means.

The diagnosing means preferably corrects the wind velocity detected by the wind velocity sensor according to the detected vehicle speed, and diagnoses the operating state of the ozone purifying means based on the corrected wind velocity.

The diagnosing means preferably corrects the wind velocity detected by the wind velocity sensor according to the detected vehicle speed and determines that a purifying characteristic of the purifying means is degraded when the corrected wind velocity decreases to a predetermined threshold value or less, the diagnosing means giving a warning.

According to a third aspect of the present invention, there is provided an ozone purifying apparatus for a vehicle, comprising: ozone purifying means provided on the vehicle;

first ozone concentration detecting means for detecting a concentration of ozone in air which flows into the ozone purifying means; second ozone concentration detecting means for detecting a concentration of ozone in air which has passed through the ozone purifying means; and degradation detecting means for detecting degradation of the ozone purifying means by using outputs from the first and second ozone concentration detecting means.

With this configuration, the concentration of ozone in air which flows into the ozone purifying catalyst and the concentration of ozone in air which has passed through the ozone purifying catalyst are detected, and the degradation of the ozone purifying catalyst is detected by the detected concentrations of ozone. Accordingly, it is possible to directly detect the purifying ability of the ozone purifying catalyst, and hence to detect the degradation of the ozone purifying apparatus due to various causes, for example, the degradation due to adhesion of adhered matter such as dust or the degradation due to $SO_x$.

The apparatus preferably includes airflow detecting means for detecting an amount of airflow passing through the ozone purifying means, wherein the degradation detecting means detects the degradation of the ozone purifying means according to outputs from the first and second ozone concentration detecting means and an output from the airflow detecting means.

With this configuration, the amount of airflow passing through the ozone purifying means is detected, and the degradation of the ozone purifying means is detected according to outputs from the first and second ozone concentration detecting means and on the detected amount of airflow. Since the characteristic of the ozone purifying apparatus is proportional to a product of the purifying ability of the ozone purifying apparatus and the amount of airflow passing through the ozone purifying means, it is possible to detect the ozone purifying catalyst by totally evaluating the characteristic of the ozone purifying apparatus in consideration of the effect of clogging due to adhesion of dust or the like by detecting an amount of airflow passing through the ozone purifying apparatus, to thereby more accurately detect degradation of the ozone purifying means.

The apparatus preferably further includes ozone supply means for supplying ozone into an airflow passing through the ozone purifying means, on the upstream side of the first ozone concentration detecting means.

With this configuration, ozone is supplied into the airflow passing through the ozone purifying means, on the upstream side of the first ozone concentration detecting means. Therefore, it is possible to accurately detect the purifying ability of the ozone purifying catalyst even if the detection range of the ozone concentration detecting means is narrow.

The apparatus preferably includes a diffusion prevention pipe for preventing diffusion of ozone supplied from the ozone supply means.

The apparatus preferably includes ozone decomposing means for decomposing ozone, which is disposed on the downstream side of the second ozone concentration detecting means.

The apparatus preferably includes a circulation-type diffusion prevention pipe which has an upstream diffusion prevention pipe disposed on the upstream side of the ozone purifying means and a downstream diffusion prevention pipe disposed on the downstream side from the ozone purifying means, the downstream diffusion prevention pipe being connected to the upstream diffusion prevention pipe.

The circulation-type diffusion prevention pipe is preferably provided with wind blowing means for generating an airflow, and the blowing means is operated such that an airflow rate becomes a value suitable for detection of a concentration of ozone by the first and second ozone concentration detecting means.

The apparatus preferably includes moving means for moving the ozone concentration detecting means, the ozone supply means, and the diffusion prevention pipe to a position where none of the ozone. concentration detecting means, the ozone supply means, and the diffusion prevention pipe obstructs an airflow into or from the ozone purifying means when the degradation detection is not executed.

BRIEF DESCRIPTION OF THE DRAWINGS

FIG. 10 is a view showing another modification of the configuration shown in FIGS. 4A to 4C;

FIGS. 11A to 11C are views showing a modification of the configuration shown in FIG. 10;

DETAILED DESCRIPTION OF THE PREFERRED EMBODIMENTS

Hereinafter, preferred embodiments of the present invention will be described with reference to the accompanying drawings.

First Embodiment

Figure 1A:
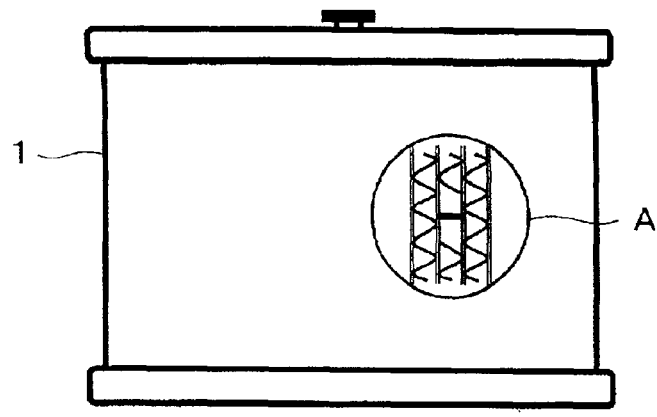
FIGS. 1A and 1B are views showing a configuration of an ozone purifying apparatus according to a first embodiment of the present invention.
Figure 1B:
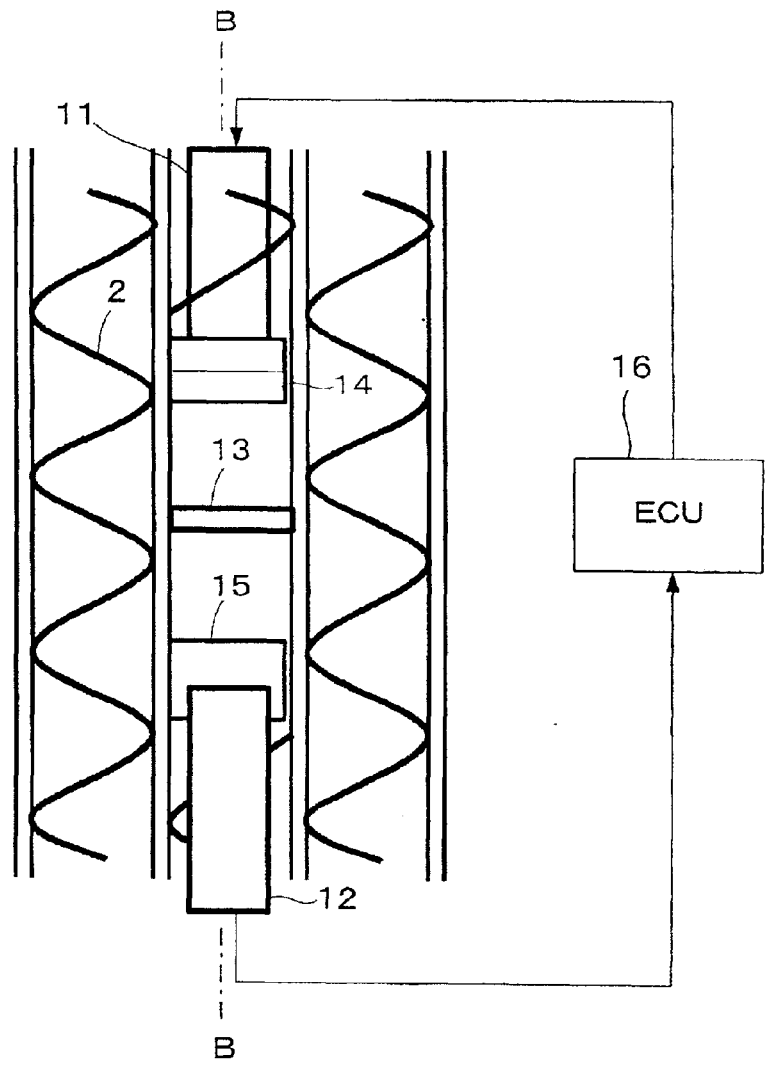
Figure 2:
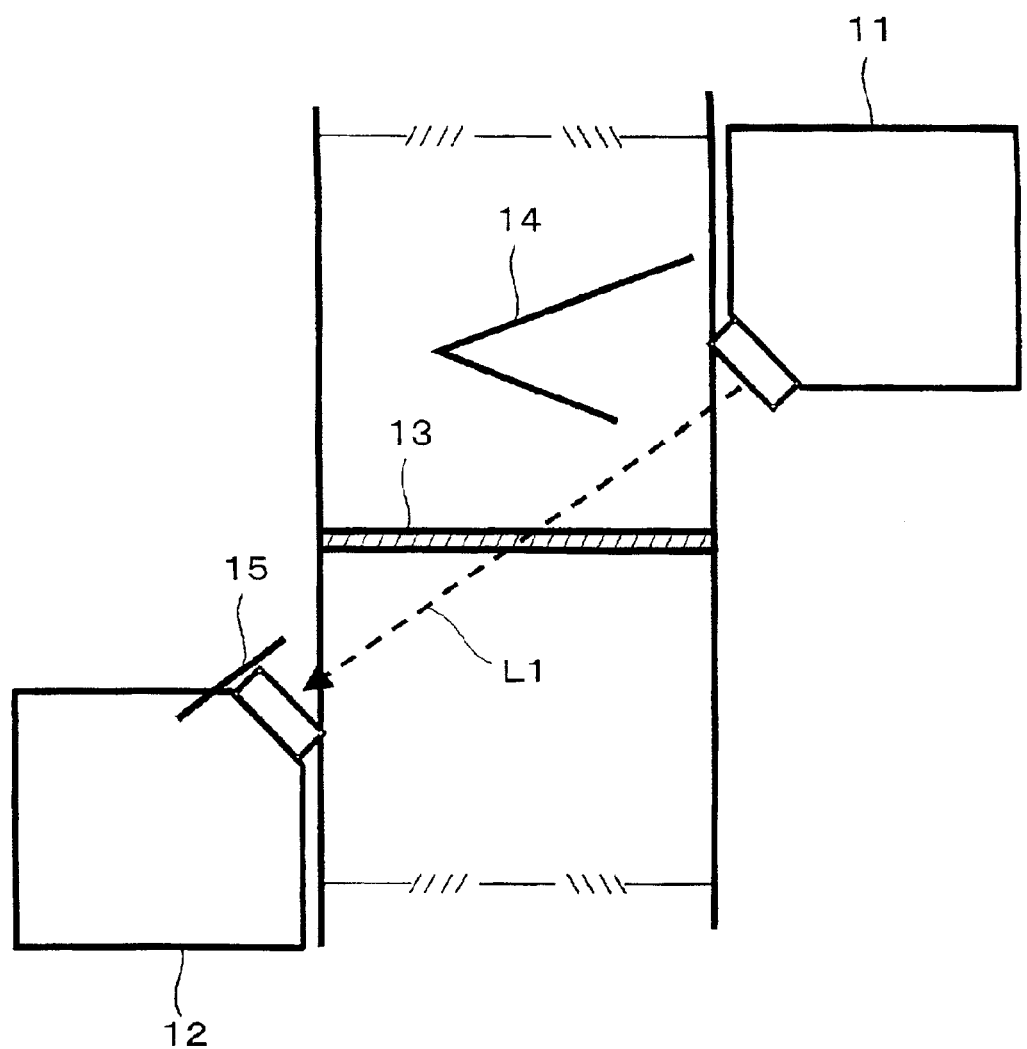
FIG. 2 is a sectional view taken on line B—B of FIG. 1B showing a configuration of adhered matter amount detecting block.

FIGS. 1A, 1B and FIG. 2 are views showing a configuration of an ozone purifying apparatus according to a first embodiment of the present invention. The ozone purifying apparatus includes ozone purifying catalysts spread on the surface of a radiator 1 of a vehicle, and an adhered matter amount detecting block for detecting an amount of adhered matter (contamination) adhering on the surface of the radiator 1. The ozone purifying catalyst mainly contains manganese carbonate ($MnCO_3$) and manganese oxide ($MnO_x$) as disclosed, for example, in Japanese Patent Laid-open No. Hei 5-317717.

The radiator 1 is a heat radiating means provided to lower the temperature of engine cooling water for cooling an engine (not shown) of the vehicle.

FIG. 1B is an enlarged view of a portion A shown in FIG. 1A, and FIG. 2 is a sectional view taken on line B—B of FIG. 1B illustrating a configuration of the adhered matter amount detecting block. The adhered matter amount detecting block includes a light emitting block 11 in which a light emitting device, typically, a light emitting diode is provided; a light receiving block 12 in which a light receiving device, typically, a photo-transistor which functions as a sensor for detecting a quantity of light is provided; a contamination measuring plate 13 disposed on an optical path along which a light ray L1 emitted from the light emitting block 11 enters the light receiving block 12, the plate 13 allowing the light ray L1 to pass therethrough; contamination prevention hoods 14 and 15 for covering a portion, from which the light ray L1 is emitted, of the light emitting block 11 and a portion, at which the light rays L1 enters, of the light receiving block 12, thereby preventing both portions of the light emitting block 11 and the light receiving block 12, respectively, from being contaminated, and an electronic control unit (hereinafter, referred to as "ECU") 16, connected to both the light emitting block 11 and the light receiving block 12, for determining an amount of adhered matter adhering to the contamination measuring plate 13 according to a light quantity detected by the light receiving block 12.

A portion of a fin 2 of the radiator 1 is cut off, and the contamination measuring plate 13 is placed in the cutoff portion in parallel with the running direction of the vehicle. A contaminated state of the contamination measuring plate 13, that is, an amount of adhered matter adhering on the contamination measuring plate 13 is regarded as being substantially the same as a contaminated state of the ozone purifying catalysts spread on the surface of the fin 2 or the like of the radiator 1. Accordingly, the ECU 16 detects a light quantity IL1 of the light ray L1 passed through the contamination measuring plate 13 and turns on an alarm lamp indicating the degradation of the purifying characteristic of the ozone purifying catalysts when the light quantity IL1 decreases to a determination threshold value ILTH or less.

Since the portion of the light emitting block 11 and the portion of the light receiving block 12 from which the light rays L1 are emitted, and enter, respectively, are prevented from being contaminated by the contamination prevention hoods 14 and 15, the effect of contamination of portions other than the contamination measuring plate 13 can be eliminated.

In the above-mentioned embodiment, the radiator 1 corresponds to heat radiating means. The contamination measuring plate 13, the light emitting block 11, and the light receiving block 12 correspond to estimating means. The ECU 16 corresponds to diagnosing means.

Modification of the First Embodiment

Figure 3:
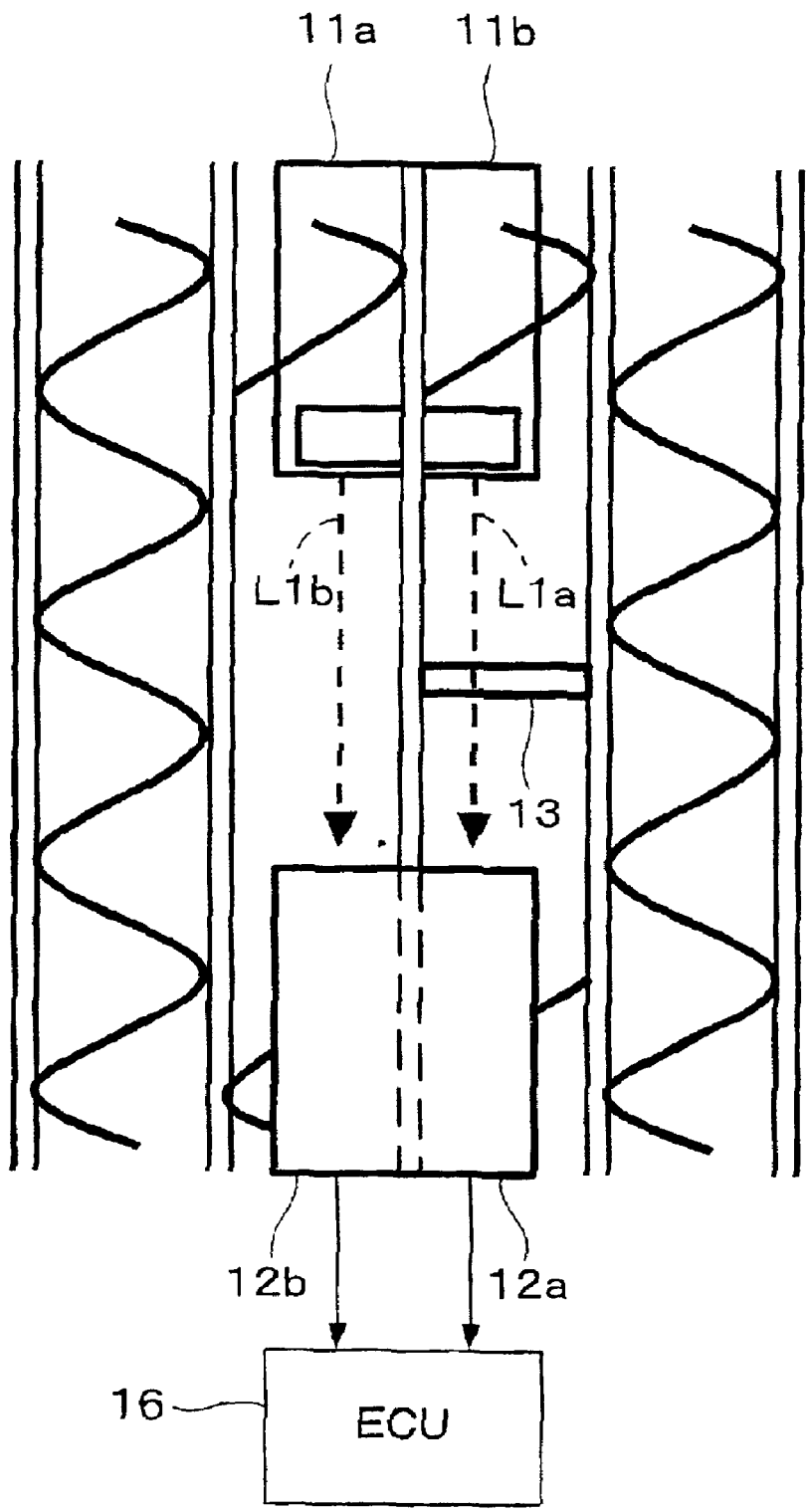
FIG. 3 is a view showing a modification of the configuration shown in FIGS. 1A and 1B.

FIG. 3 is a view showing a modification of the configuration shown in FIG. 1B. In this modification, the adhered matter amount detecting block includes two light emitting blocks 11a and 11b and two light receiving blocks 12a and 12b facing to the light emitting blocks 11a and 11b. The contamination measuring plate 13 is provided between the light emitting block 11a and the light receiving block 12a, and outputs from the light receiving blocks 12a and 12b are supplied to the ECU 16. The light receiving block 12a receives a light ray 11a passed through the contamination measuring plate 13, while the light receiving block 12b directly receives a light ray 11b emitted from the light emitting block 11a. Light quantities ILa and ILb of the light rays L1a and L1b are detected by the ECU 16. If a light quantity difference DIL (=ILb−ILa) reaches a predetermined threshold value ILTHa or more, or if a light quantity ratio RIL (=ILa/ILb) decreases to a predetermined ratio RILTH or less, the ECU 16 turns on the alarm lamp indicating the degradation of the purifying characteristic of the ozone purifying catalysts.

According to this modification, the degree of contamination of the light emitting block 11a is regarded as being substantially the same as that of the light emitting block 11b. Also, the degree of contamination of the light receiving block 12a is regarded as being substantially the same as that of the light receiving block 12b. Therefore, the contaminated state of the contamination measuring plate 13 can be accurately detected by canceling the effects of the contaminated states of the light emitting blocks and the light receiving blocks.

Second Embodiment

Figure 4A:
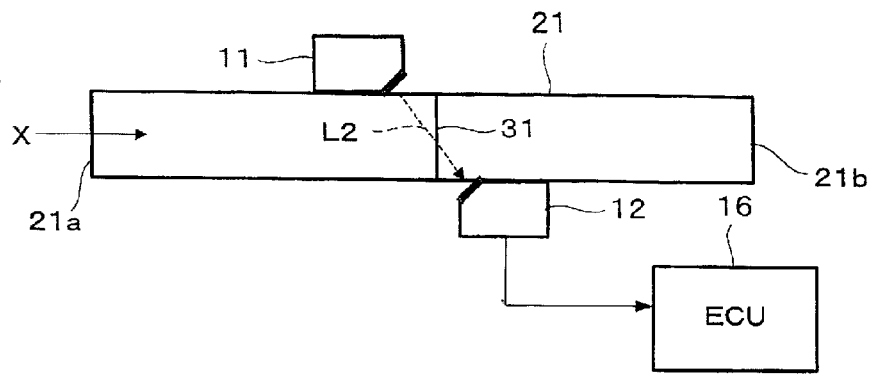
FIGS. 4A to 4C are views each showing a configuration of the adhered matter amount detecting block of an ozone purifying apparatus according to a second embodiment of the present invention.

FIG. 4A is a view showing a configuration of an adhered matter amount detecting block of an ozone purifying apparatus according to a second embodiment of the present invention. In this embodiment, an air passage 21 having an inlet 21a and an outlet 21b is provided for allowing air to flow in the direction X in the figure during running of a vehicle. A filter 31 is disposed in the air passage 21, wherein a light quantity IL2 of a light ray L2 which has passed through the filter 31 is detected by a light emitting block 11 and a light receiving block 12. The filter 31 is capable of cutting off dust particles of a size that is larger than about 100 μm for example.

Figure 5A:
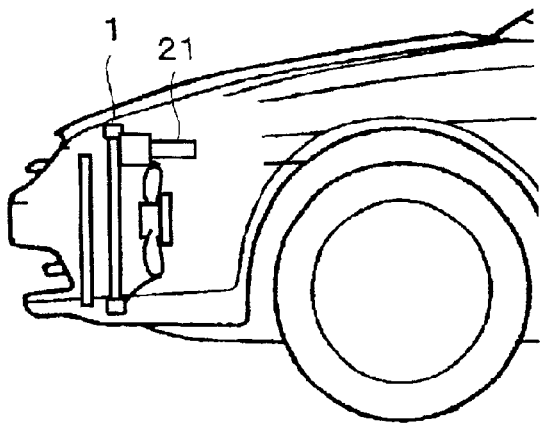
FIGS. 5A to 5C are side views each illustrating a mounting position of the adhered matter amount detecting block shown in FIGS. 4A to 4C.
Figure 5B:
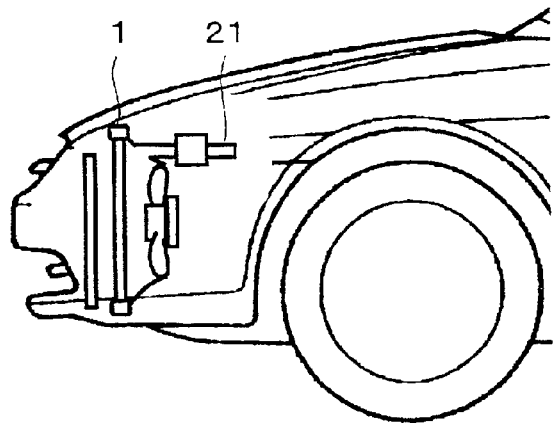
Figure 5C:
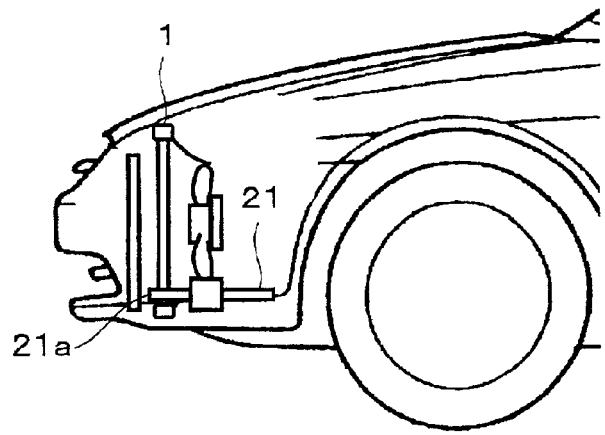
Figure 6:
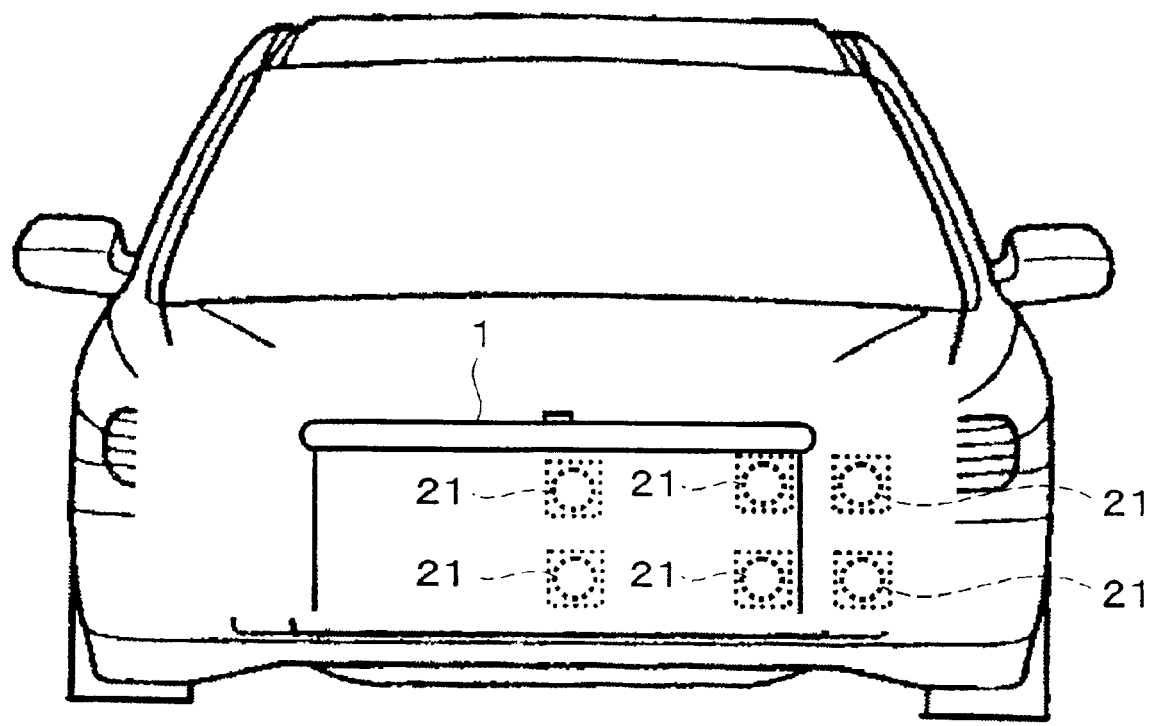
FIG. 6 is a front view illustrating a mounting position of the adhered matter amount detecting block shown in FIGS. 4A to 4C.

According to this embodiment, as shown in FIG. 5A or 5B, the air passage 21 of the adhered matter amount detecting block is disposed so that air which has passed through a radiator 1 may pass through the air passage 21. Alternatively, as shown in FIG. 5C, the inlet 21a of the air passage 21 may be disposed in front of the radiator 1 for capturing air flowing into the radiator 1. The air passage 21 may be located in any position across the width of the vehicle. For example, as shown in FIG. 6, the air passage may be located in the neighborhood of or in a central portion of the radiator 1, an end portion of the radiator 1, or a portion offset slightly outwardly from the radiator 1 across the width of the vehicle.

In this embodiment, the radiator 1 corresponds to heat radiating means. The filter 31, the light emitting block 11, and the light receiving block 12 correspond to estimating means. The ECU 16 corresponds to diagnostic means.

First Modification of the Second Embodiment

Figure 4B:
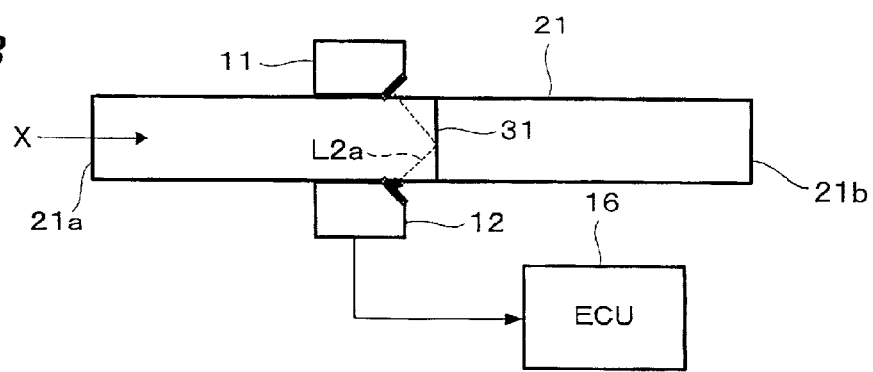

FIG. 4B is a view showing a modification of the configuration shown in FIG. 4A. In this modification, the light receiving block 12 is configured to detect a light quantity of a light ray L2a being reflected off of the filter 31, instead of the light ray L2 passing through the filter 31.

Second Modification of the Second Embodiment

Figure 4C:
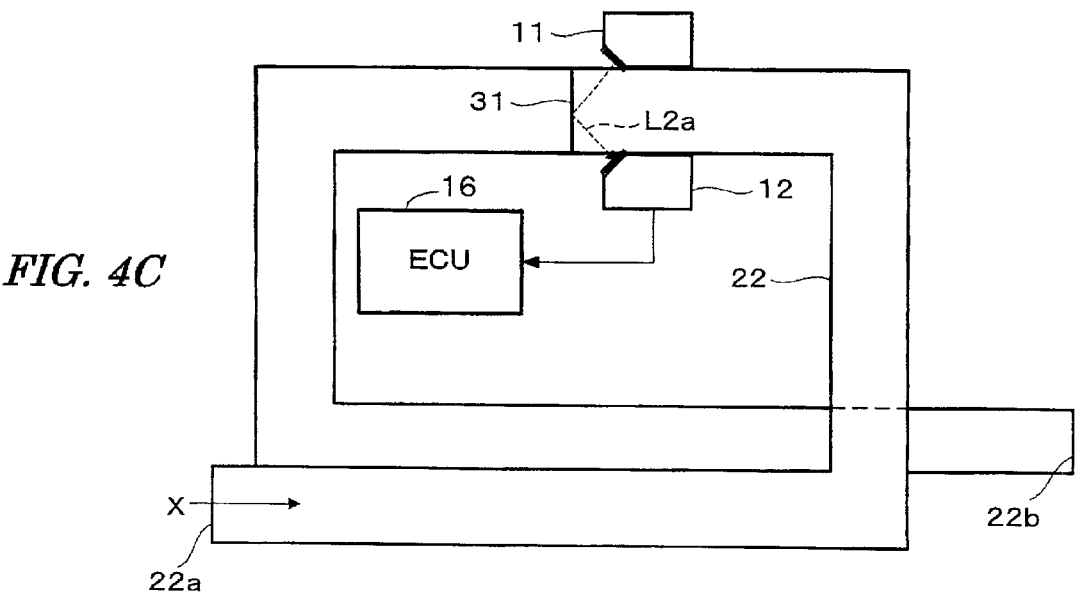

FIG. 4C is a view showing a modification of the configuration shown in FIG. 4B. In each of the configurations shown in FIGS. 4A and 4B, light rays entering from the inlet 21a or outlet 21b of the air passage 21 may exert an adverse effect on the detection of an amount of adhered matter. Specifically, the increased light quantity for detection may make the detected amount of contamination less than the actual amount of contamination. Therefore, in this modification, the air passage 21 extending in straight line is replaced with an air passage 22 bent in four 90° angles. According to this modification, even if light enters from an inlet 22a or an outlet 22b, the adverse effect thereof can be eliminated. As a result, it is possible to more accurately detect an amount of adhered matter.

Third Modification of the Second Embodiment

Figure 7A:
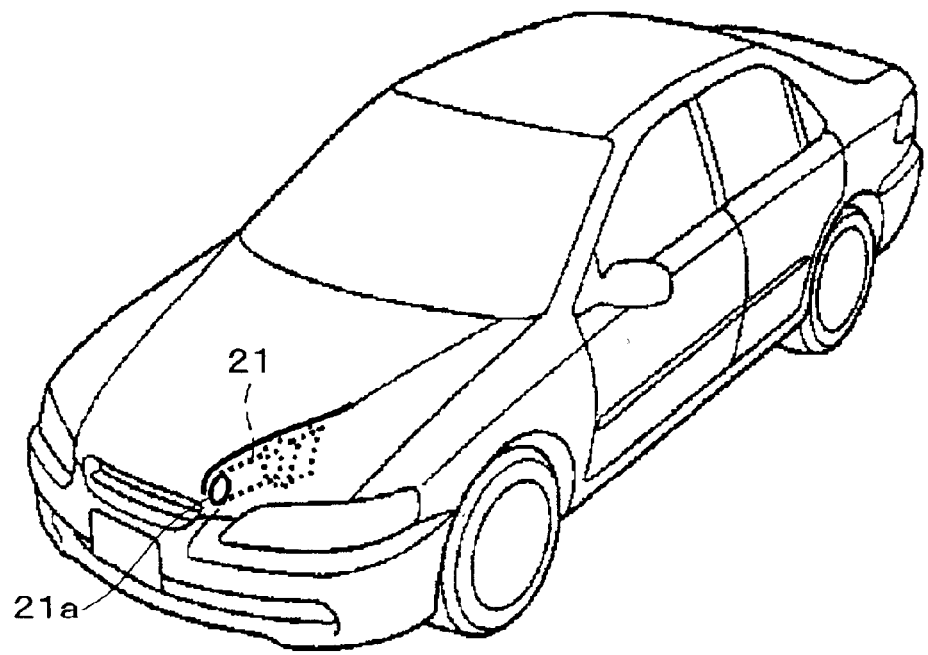
FIGS. 7A and 7B are perspective views each illustrating an example of an inlet for the air passage of the adhered matter amount detecting block is provided outside a bonnet.
Figure 7B:
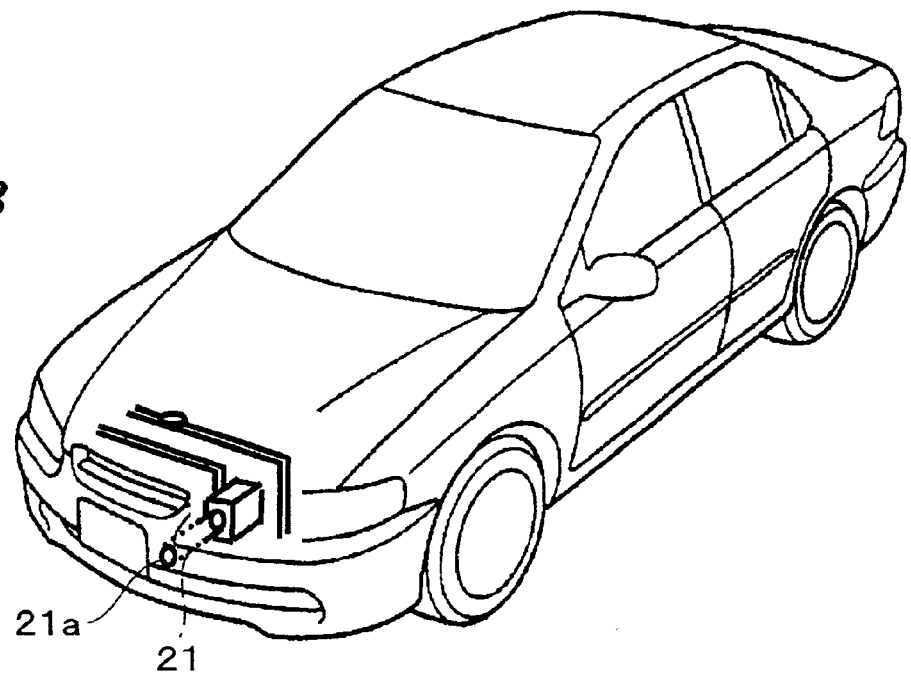

In this modification, as shown in FIGS. 7A and 7B, the inlet 21a of the air passage 21 is opened to the outside of a bonnet.

Fourth Modification of the Second Embodiment

Figure 8A:
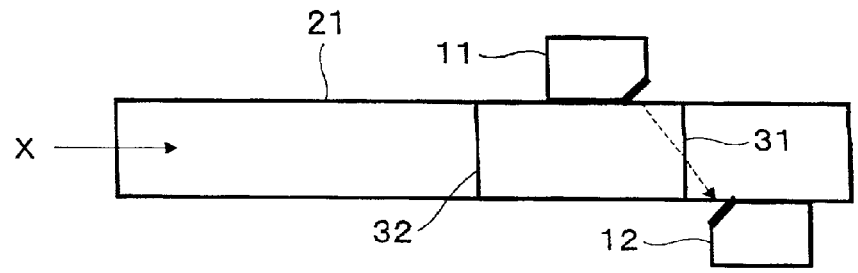
FIGS. 8A and 8B are views showing a modification of the configuration shown in FIGS. 4A to 4C.
Figure 8B:
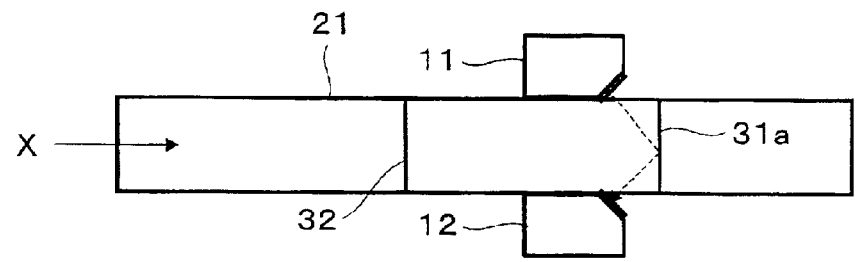

FIGS. 8A and 8B are views showing another modification of the second embodiment. In this modification, a filter 32 is added to each of the configurations shown in FIGS. 4A and 4B. The provision of the filter 32 is effective for retarding the contamination of the filter 31, and hence to allow monitoring for a long period of time. This modification, therefore, is suitable for realizing long-term monitoring with respect to the ozone purifying catalyst which has a long-term dust resistance.

Fifth Modification of the Second Embodiment

Figure 9A:
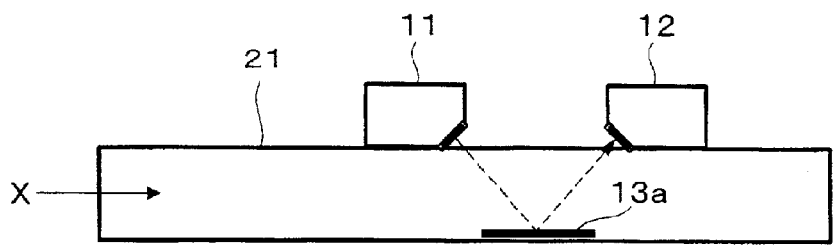
FIGS. 9A and 9B are views showing another modification of the configuration shown in FIGS. 4A to 4C.
Figure 9B:
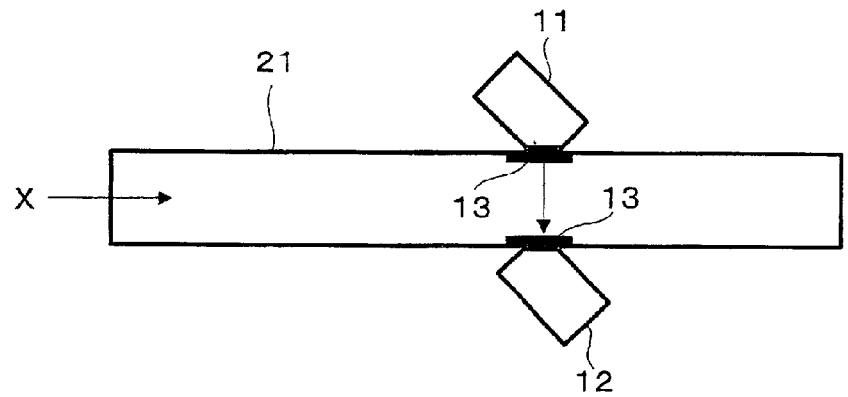

FIGS. 9A and 9B are views showing another modification of the second embodiment. In this modification, the filter 31 is replaced with a contamination measuring plate 13a or 13 which is basically the same as that described in the first embodiment. In the example shown in FIG. 9A, the contamination measuring plate 13a having a high light reflectance is placed on the bottom surface of the air passage 21, wherein an amount of adhered matter is detected by detecting a quantity of light being reflected from the contamination measuring plate 13a.

In the example shown in FIG. 9B, the contamination measuring plates 13 each having a high light transmittance are placed on a section, from which light is emitted, of the light emitting block 11 and on a section, at which light enters, of the light receiving block 12. An amount of adhered matter is detected by detecting a quantity of light passing through the two contamination measuring plates 13.

In this modification, since the contamination measuring plate is disposed in parallel to the airflow, the monitoring period can be longer than that of the apparatus using the filter 31 disposed in the direction perpendicular to the airflow.

Sixth Modification of the Second Embodiment

FIG. 10 is a view showing another modification of the second embodiment. In this modification, when the vehicle runs at the maximum speed, a water droplet 100 entering the air passage 21 from its inlet is exhausted from an outlet 41 located in front of a trap net 33, as shown by a dashed line 101. When the vehicle runs at an ordinary speed, the water droplet 100 drops on the bottom surface of the air passage 21 at a position before the outlet 41. The trap net is provided for preventing small pieces of garbage and/or worms from reaching the filter 31. According to this modification, it is possible to prevent water droplets, small pieces of garbage, and/or worms from adhering to the filter 31.

As shown in FIG. 11A, preferably, the trap net 33 is obliquely mounted and the size of the outlet 41 is made large. This makes it possible to promote the exhaust of garbage or the like caught by the trap net 33. In FIG. 11A, reference numeral 10 designates the adhered matter amount detecting block including the light emitting block, the light receiving block, and the filter.

The configuration shown in FIG. 11A may be further replaced with each of configurations shown in FIGS. 11B and 11C. In the configuration shown in FIG. 11B, the structure of the outlet 41 is improved so that garbage or the like can be more easily exhausted. In the configuration shown in FIG. 11C, a branch passage 23 is provided, and the adhered matter amount detecting block 10 and trap nets 33 and 34 are disposed in the branch passage 23.

Third Embodiment

In this embodiment, an amount of adhered matter is detected by means of a pressure or a wind velocity, instead of light.

Figure 12A:
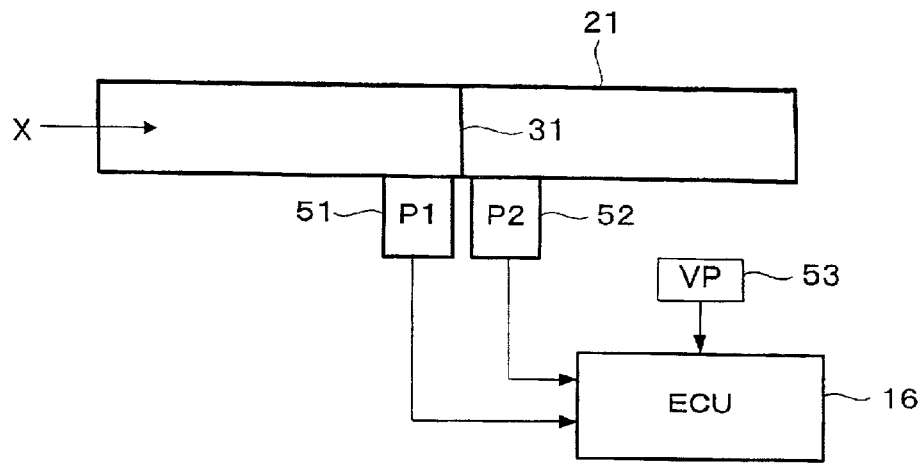
FIGS. 12A and 12B are views showing a configuration of the adhered matter amount detecting block according to a third embodiment of the present invention.

In an example shown in FIG. 12A, an air passage 21 is provided with a pressure sensor 51 for detecting a pressure P1 on the upstream side of a filter 31 provided in the air passage 21 and a pressure sensor 52 for detecting a pressure P2 on the downstream side of the filter 31. An amount of adhered matter adhering on the filter 31 is detected according to a pressure difference (=P1−P2) or a pressure ratio (=P1/P2). Detection signals of the pressure sensors 51 and 52 are supplied to the ECU 16. The ECU 16 determines that an amount of adhered matter becomes larger as the pressure difference (or pressure ratio) increases. Since the pressures detected by the pressure sensors 51 and 52 change depending on a vehicle speed VP, the ECU 16 corrects the detected pressure according to the vehicle speed VP detected by a vehicle speed sensor 53. Specifically, the ECU 16 corrects the pressure difference (pressure ratio) obtained from the outputs from the pressure sensors 51 and 52 so that the pressure difference (pressure ratio) becomes smaller as the vehicle speed VP increases. When the corrected pressure difference (pressure ratio) reaches a predetermined threshold value or more, the ECU turns on an alarm lamp indicating the degradation of the purifying characteristic of the ozone purifying catalysts to give a warning to the driver of the vehicle.

Figure 12B:
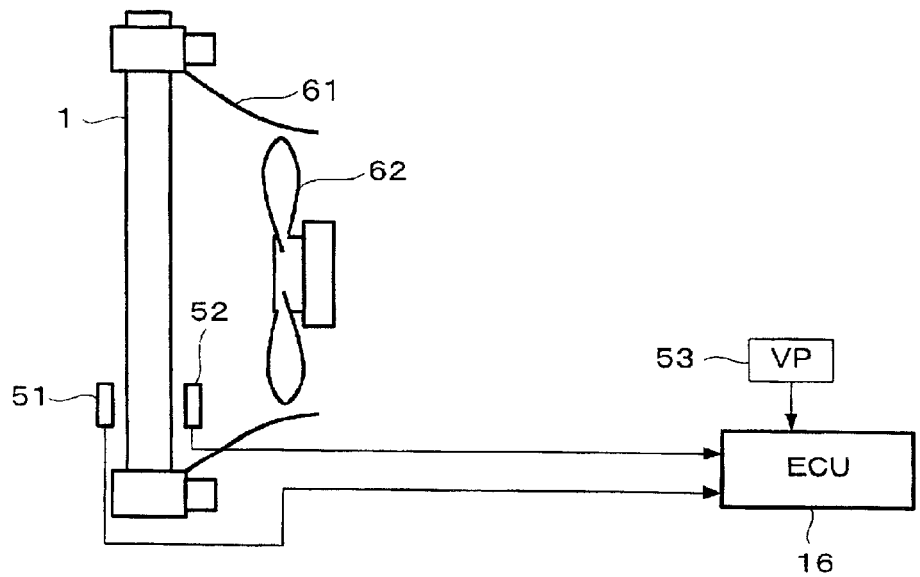

In an example shown in FIG. 12B, a radiator fan 62 and a fan shroud 61 for improving a cooling efficiency of the radiator fan 62 are provided on the downstream side (rear side) of a radiator 1. A pressure sensor 51 is provided on the upstream side (front side) of the radiator 1 while a pressure sensor 52 is provided on the downstream side (rear side) of the radiator 1. An amount of adhered matter adhering on the surface of the radiator 1 is detected according to a pressure difference (or pressure ratio) between pressures detected by the pressure sensors 51 and 52 and the vehicle speed VP.

Alternatively, only the pressure sensor 52 may be provided by omitting the pressure sensor 51. In this case, an amount of adhered matter adhering on the surface of the radiator 1 is detected during stoppage of the vehicle, according to a difference between a pressure detected during operation of the radiator fan 62 and a pressure detected during non-operation of the radiator fan 62.

Figure 13A:
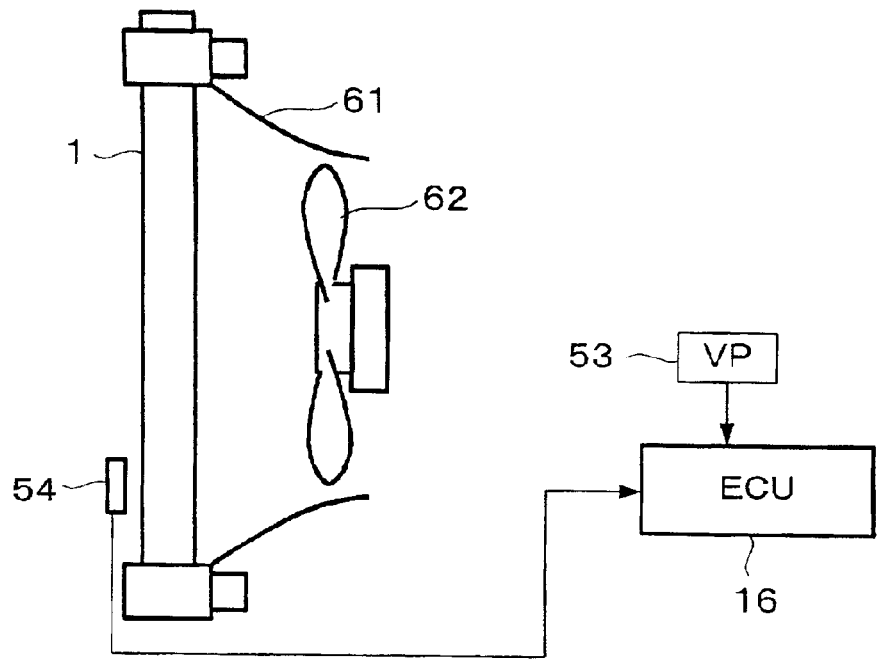
FIGS. 13A and 13B are views showing a modification of the configuration shown in FIGS. 12A and 12B.
Figure 13B:
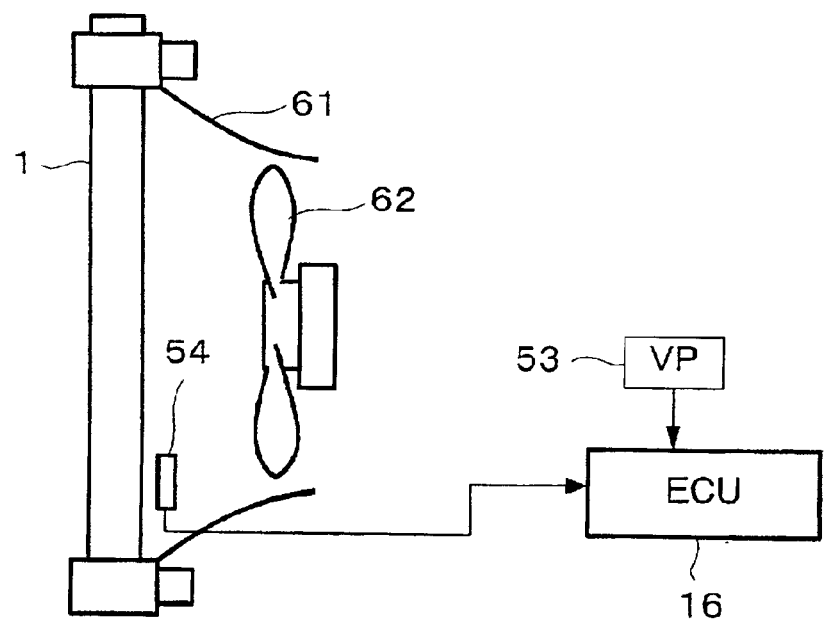
Figure 14:
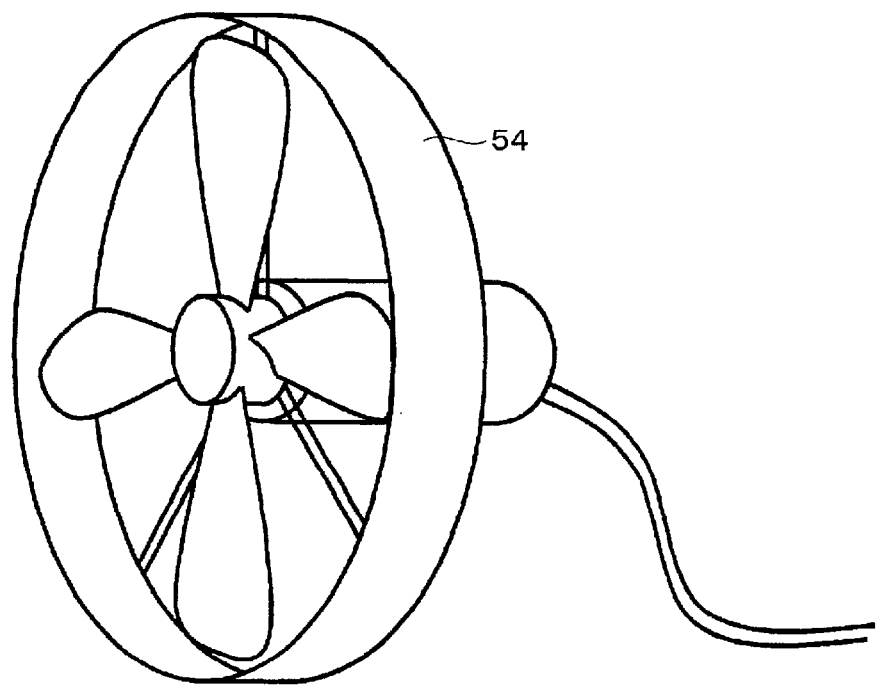
FIG. 14 is a perspective view of a wind velocity sensor shown in FIGS. 13A and 13B.

In an example shown in FIGS. 13A and 13B, a wind velocity sensor 54 is provided on the upstream side (see FIG. 13A) or on the downstream side (see FIG. 13B) of the radiator 1, wherein an amount of adhered matter adhering on the surface of the radiator 1 is detected according to a wind velocity VW detected by the wind velocity sensor 54 and the vehicle speed VP. In this case, the amount of adhered matter becomes larger as the wind velocity VW as compared with the vehicle speed VP becomes lower. The wind velocity sensor 54 is typically configured as shown in FIG. 14. The ECU 16 corrects the wind velocity VW detected by the wind velocity sensor 54 according to the vehicle speed VP. When the corrected wind velocity decreases to a predetermined threshold value or less, the ECU turns on the alarm lamp indicating the degradation of the purifying characteristic of the ozone purifying catalysts to give a warning to the driver of the vehicle.

In this embodiment, the filter 31 and the pressure sensors 51 and 52 correspond to estimating means. The wind velocity sensor 54 corresponds to airflow detecting means. The ECU 16 corresponds to diagnosing means.

Fourth Embodiment

Figure 15:
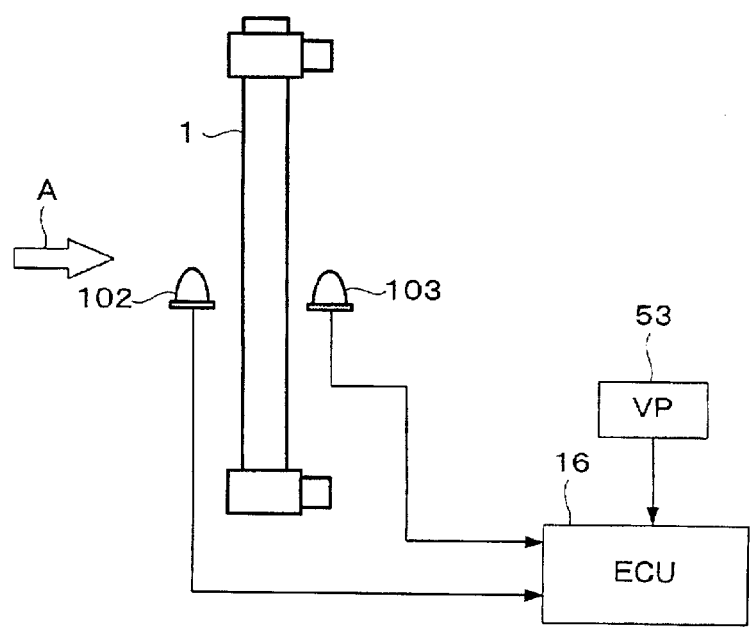
FIG. 15 is a view showing a configuration of an ozone purifying apparatus according to a fourth embodiment of the present invention.

FIG. 15 is a view showing a configuration of an ozone purifying apparatus for a vehicle according to a fourth embodiment of the present invention. The ozone purifying apparatus includes ozone purifying catalysts spread on the surface of a radiator 1 of a vehicle, ozone concentration sensors 102 and 103 for detecting a concentration of ozone in air, a vehicle speed sensor 53 for detecting a running speed (vehicle speed) VP of the vehicle, and an ECU 16 for detecting the degradation of the ozone purifying catalysts according to outputs from these sensors 102, 103, and 53. The ozone purifying catalyst mainly contains manganese carbonate ($MnCO_3$) and manganese oxide ($MnO_x$) as disclosed, for example, in Japanese Patent Laid-open No. Hei 5-317717. Each of the ozone concentration sensors 102 and 103 is configured as a gas sensitive body made from a compound containing a bivalent metal such as magnesium (Mg) or calcium (Ca), indium (In), and oxygen (O), as disclosed, for example, in Japanese Patent Laid-open No. Hei 6-82409.

The radiator 1 is a heat radiating means provided to lower the temperature of engine cooling water for cooling an engine (not shown) of the vehicle.

An airflow generated by the running of the vehicle, flows as shown by an arrow A in FIG. 15. The ozone concentration sensor 102 is disposed on the upstream side of the radiator 1 in the direction of the air flow A, and the ozone concentration sensor 103 is disposed on the downstream side from the radiator 1 in the direction of the air flow A. A concentration of ozone in air which flows into the ozone purifying catalysts is detected by the upstream side ozone concentration sensor 102, and a concentration of ozone in air which has passed through the ozone purifying catalysts is detected by the downstream side ozone concentration sensor 103.

The degradation of the ozone purifying catalysts is detected by comparing an upstream side ozone concentration CTO3U detected by the upstream side ozone concentration sensor 102 with a downstream side ozone concentration CTO3L detected by the downstream side ozone concentration sensor 103. Specifically, if a purifying ratio RP defined as RP=1-CTO3L/CTO3U decreases to 50% or less of a purifying ratio RP0 in the initial state (in the state of a new product), the ECU 16 determines that the ozone purifying catalysts are degraded. The ECU 16 informs a driver of the result, for example, by lighting an alarm lamp. Alternatively, a degradation degree RD defined as RD=RP/RP0 may be displayed.

According to this embodiment, the concentration of ozone in air which flow into the radiator 1 including the ozone purifying catalysts spread thereon and the concentration of ozone in air which has passed through the radiator 1 are detected, and the degradation of the ozone purifying catalysts is detected by using the detected concentrations of ozone. Accordingly, the purifying ability of the ozone purifying catalysts can be directly detected, and therefore, the degradation of the ozone purifying apparatus due to various causes, for example, the degradation due to adhesion of extraneous matter such as dust or the degradation due to $SO_x$ can be detected.

Figure 17:
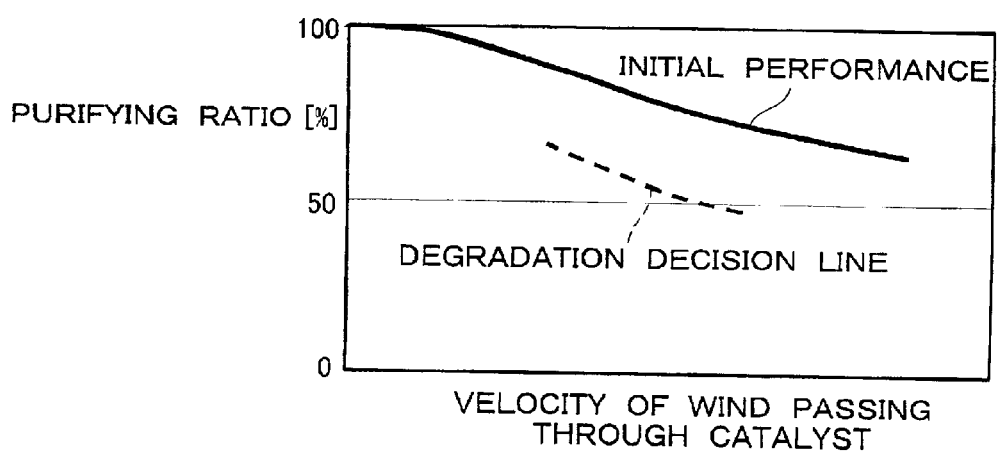
FIG. 17 is a graph showing a relationship between the velocity of an airflow (wind velocity) passing through ozone purifying catalysts and a purifying ratio.

The ozone purifying ratio RP changes, as shown by a solid line in FIG. 17, depending on a wind velocity, that is, an airflow rate. Specifically, the purifying ratio RP becomes lower as the wind velocity increases. Accordingly, as shown by a broken line in FIG. 17, a threshold value for determination of degradation may be set to a value which becomes smaller as the wind velocity increases. In this case, it may be desirable that the wind velocity is estimated according to the detected vehicle speed VP and the threshold value for determination of degradation is set according to the estimated wind velocity.

In the fourth embodiment shown in FIG. 15, the ECU 16 constitutes degradation detecting means, and the vehicle speed sensor 53 constitutes airflow detecting means.

First Modification of the Fourth Embodiment

Figure 16:
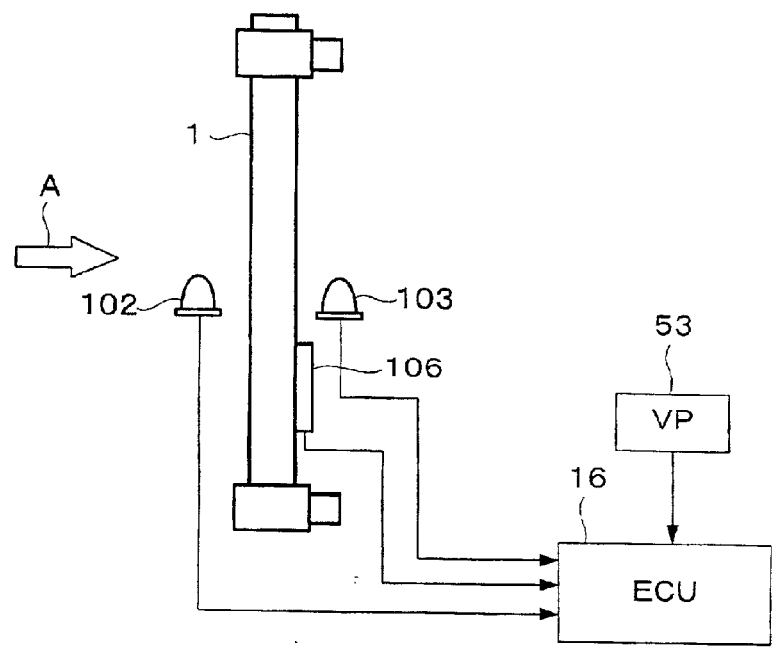
FIG. 16 is a view showing a modification of the configuration shown in FIG. 15.

FIG. 16 is a view showing a modification of the fourth embodiment. In this modification, a wind velocity sensor 106 is provided adjacent to the radiator 1 and on the downstream side of the radiator 1. A wind velocity is detected by the wind velocity sensor 106. With this configuration, since the decreasing of a wind velocity due to clogging of the ozone purifying catalysts can be taken into account, it is possible to more accurately detect the degradation degree of the ozone purifying catalysts.

The wind velocity sensor may be replaced with two pressure sensors provided on the upstream side and downstream side of the radiator 1. In this case, an amount of airflow passing through the radiator 1 is detected according to a difference between pressures detected by the two pressure sensors, and a wind velocity is estimated according to the detected amount of airflow.

In this modification, the wind velocity sensor 106 or the two pressure sensors provided on the upstream side and the downstream side from the radiator 1 constitutes or constitute airflow detecting means.

Second Modification of the Fourth Embodiment

Figure 18:
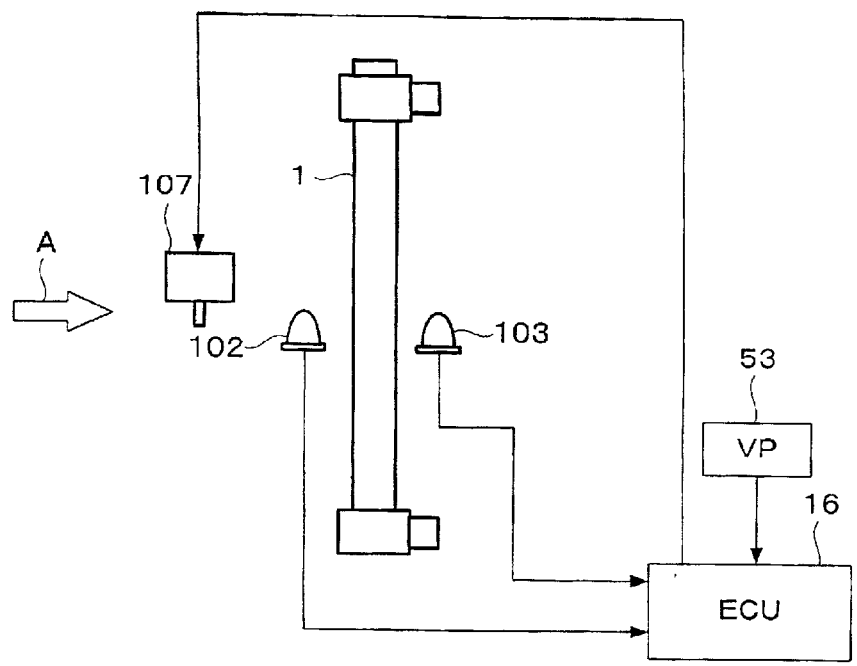
FIG. 18 is a view showing a modification of the configuration shown in FIG. 15.

FIG. 18 is a view showing another modification of the fourth embodiment.

A concentration of ozone present over an actual road largely changes depending on the reaction with NO (nitrogen monoxide) exhausted from a vehicle. Further, in winter when the air temperature and solar radiation amount decreases, the concentration of ozone in air also decreases. Under such conditions, an ozone concentration sensor may sometimes be unable to accurately detect a degradation degree of ozone, purifying catalysts because a response speed is too low or the actual concentration is out of the detectable concentration range.

To cope with such an inconvenience, according to this modification, as shown in FIG. 18, an ozone generator 107 acting as an ozone supply means for supplying ozone is provided on the upstream side of the upstream side ozone concentration sensor 102.

Figure 20:
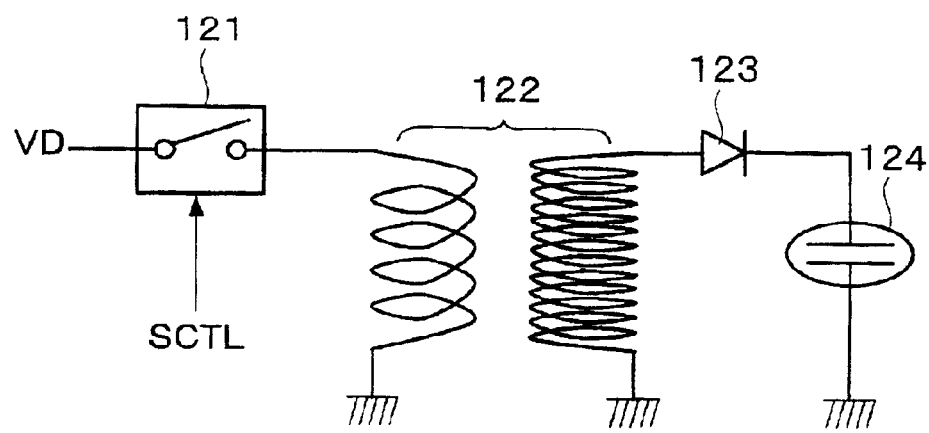
FIG. 20 is a circuit diagram of an ozone generator.

FIG. 20 is a circuit diagram showing a configuration example of the ozone generator 107. The ozone generator 107 includes a switch 121 to which a dc voltage VD is supplied, a booster coil 122, a diode 123, and a corona electrode 124. A control signal SCTL is supplied from the ECU 16 to the switch 121, to control the on-off of the switch 121. When the switch 121 is turned on, a high voltage is generated on a secondary side of the booster coil 122, to generate a discharge in the corona electrode 124, thereby generating ozone.

In this modification, since ozone is generated by the ozone generator 107 for increasing a concentration of ozone up to a value which is enough to ensure the accuracy of the ozone concentration sensor used, it is possible to more accurately detect the concentration of ozone, and hence to accurately detect a degradation degree of the ozone purifying catalysts.

Third Modification of the Fourth Embodiment

Figure 19:
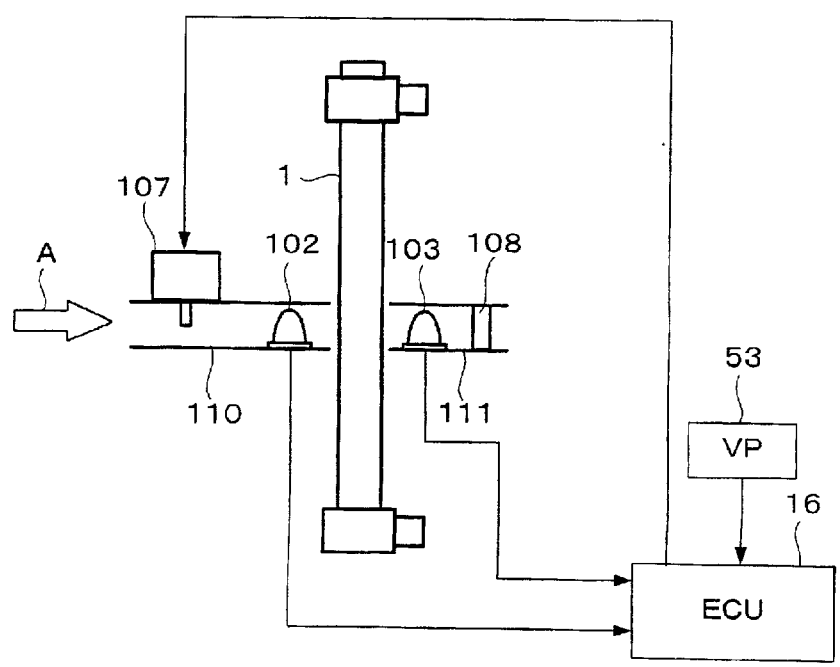
FIG. 19 is a view showing a modification of the configuration shown in FIG. 18.

FIG. 19 is a view showing another modification of the configuration shown in FIG. 18. In this modification, diffusion prevention pipes 110 and 111 are provided respectively on the upstream side and the downstream side of the radiator 1, wherein the generated ozone is made to pass through these diffusion prevention pipes 110 and 111. An ozone decomposing device 108 is provided near an outlet of the diffusion prevention pipe 111.

With this configuration, it is possible to prevent the generated ozone from being exhausted outside the vehicle. The ozone decomposing device 108 may be replaced with an ozone recovery device.

Figure 21:
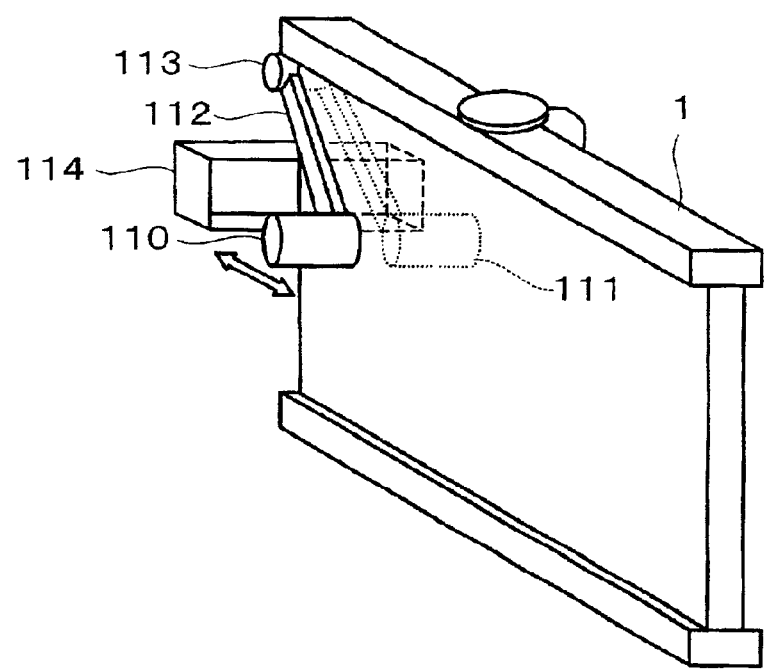
FIG. 21 is a view showing a modification of the configuration shown in FIG. 19.

When the diffusion prevention pipes 110 and 111, the ozone generator 107, and the ozone decomposing device 108 are located in the vicinities of the front side and rear side of the radiator 1, the effects of various degradation factors may be made smaller as compared with when they are located at other locations. As a result, there is a possibility that the accuracy of determining the purifying ability of the whole ozone purifying catalysts becomes lower. To cope with such an inconvenience, it may be desirable to employ a moving device as shown in FIG. 21. The moving device has a shaft 113 and an arm 112 which can pivot around the shaft 113. The diffusion prevention pipes 110 and 111, to which the ozone generator 107, the ozone decomposing device 108, and the ozone concentration sensors 102 and 103 are fixed, are mounted on the arm 112. When no operation to determine the degradation of the ozone purifying catalysts is performed, the diffusion prevention pipes 110 and 111 are contained in a housing box 114.

Fourth Modification of the Fourth Embodiment

Figure 22:
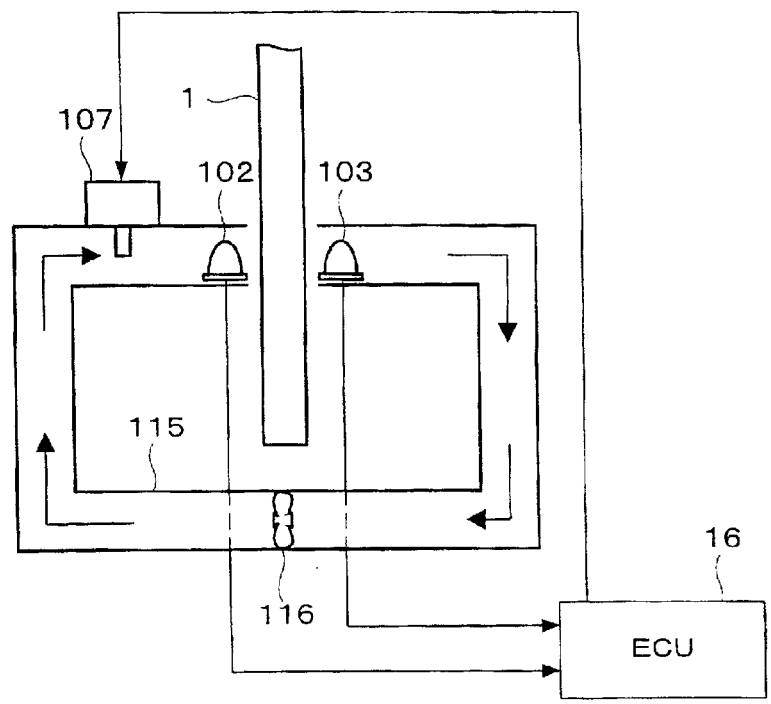
FIG. 22 is a view showing another modification of the configuration shown in FIG. 19.

FIG. 22 is a view showing another modification of the fourth embodiment, which includes a circulation-type diffusion prevention pipe 115 provided with a blower 116 in addition to the ozone generator 107 and the ozone concentration sensors 102 and 103, wherein air is circulated in the direction shown by arrows in the figure.

According to this apparatus, air containing ozone generated by the ozone generator 107 is circulated. Therefore, the generated ozone can be purified with the ozone purifying catalysts spread on the radiator 1 by inhibiting a new generation of ozone after the ozone has been initially generated and the concentration thereof has been detected.

Further, since a velocity of an airflow (wind velocity) can be adjusted by the blower 116, it is possible to set the wind velocity to a value most suitable for detection of a concentration of ozone, and hence to detect a degradation degree of the ozone purifying catalysts.

Figure 23:
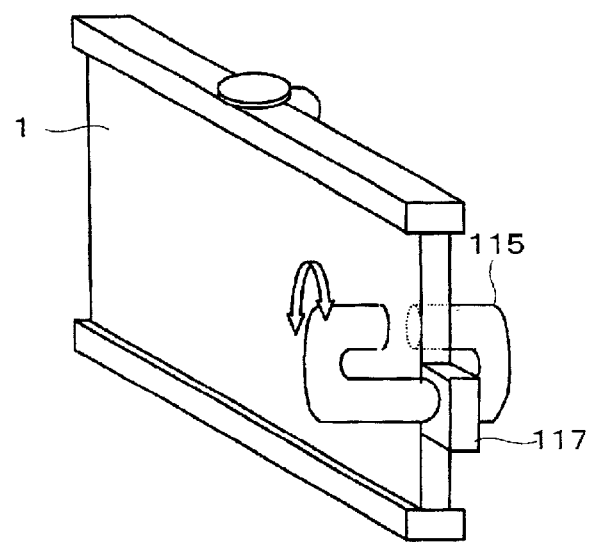
FIG. 23 is a view showing a modification of the configuration shown in FIG. 22.

Also in this case, as shown in FIG. 23, it may be desirable to provide a motive power block 117 for turning the diffusion prevention pipe 115. When no degradation detection is performed, the diffusion prevention pipe 115 is turned to such a position that the diffusion prevention pipe 115 does not overlap the front and rear surfaces of the radiator 1.

What is claimed is:

1. An ozone purifying apparatus for a vehicle, comprising:
   a heat radiating means for lowering an engine temperature;
   an ozone purifying means for purifying air, spread on a surface of said heat radiating means, wherein during the operation of the ozone purifying apparatus, matter adheres to the surface of said ozone purifying means;
   an estimating means for estimating the amount of the adhered matter adhering on said ozone purifying means; and
   a diagnosing means for diagnosing the operating state of said ozone purifying means according to an output from said estimating means.

2. An ozone purifying apparatus for a vehicle, comprising:
   a heat radiating means for lowering an engine temperature;
   an ozone purifying means for purifying air, spread on a surface of said heat radiating means wherein during the operation of the ozone purifying apparatus, matter adheres to the surface of said ozone purifying means;
   an airflow detecting means for detecting the amount of airflow passing through said heat radiating means; and
   a diagnosing means for diagnosing the operating state of said ozone purifying means according to an output of said airflow detecting means.

3. The apparatus according to claim 1, wherein said estimating means comprises at least one contamination measuring plate allowing light to pass therethrough and a contamination measuring plate allowing light to be reflected therefrom, said at least one contamination measuring plate being disposed in the vicinity of said heat radiating means;
   a light emitting means for irradiating said at least one contamination measuring plate with light; and
   a light receiving means for detecting light passing through or being reflected from said at least one contamination measuring plate.

4. The apparatus according to claim 1, wherein said estimating means comprises an air passage disposed adjacent to said heat radiating means;
   a filter allowing air and light to pass therethrough and catching dust particles of a size greater than or equal to a predetermined size, said filter being disposed in said air passage;
   a light emitting means for irradiating said filter with light; and
   a light receiving means for detecting light passing through or being reflected from said filter.

5. The apparatus according to claim 1, wherein said estimating means comprises an air passage disposed adjacent to said heat radiating means;
   a filter allowing air or light to pass therethrough and catching dust particles of a size greater than or equal to a predetermined size, said filter being disposed in said air passage; and
   pressure sensors positioned on an upstream side and a downstream side of said filter.

6. The apparatus according to claim 5, further comprising means for detecting the vehicle speed, wherein said diagnosing means corrects the pressure detected by each of said pressure sensors according to the detected vehicle speed, and diagnoses the operating state of said ozone purifying means based on a corrected pressure.

7. The apparatus according to claim 4, wherein said air passage is configured such that no external light reaches said light emitting means and said light receiving means.

8. The apparatus according to claim 3, wherein said diagnosing means determines that a purifying characteristic of said purifying means is degraded when a light quantity detected by said light receiving means is equal to or less than a predetermined threshold value, and gives a warning.

9. The apparatus according to claim 2, wherein said airflow detecting means is a wind velocity sensor positioned in front of or at a back of said heat radiating means.

10. The apparatus according to claim 9, further comprising detecting means for detecting the vehicle speed, wherein said diagnosing means corrects the wind velocity detected by said wind velocity sensor according to the detected vehicle speed, and diagnoses the operating state of said ozone purifying means based on a corrected wind velocity.

11. The apparatus according to claim 10, wherein said diagnosing means corrects the wind velocity detected by said wind velocity sensor according to the detected vehicle speed and determines that a purifying characteristic of said purifying means is degraded when the corrected wind velocity is equal to or less than a predetermined threshold value, said diagnosing means giving a warning.

12. An ozone purifying apparatus for a vehicle, comprising:
    an ozone purifying means for purifying air positioned on said vehicle;
    a first ozone concentration detecting means for detecting a concentration of ozone in air flowing into said ozone purifying means;
    a second ozone concentration detecting means for detecting a concentration of ozone in air which has passed through said ozone purifying means; and
    a degradation detecting means for detecting degradation of said ozone purifying means by using outputs from said first and second ozone concentration detecting means.

13. The apparatus according to claim 12, further comprising an airflow detecting means for detecting the amount of airflow passing through said ozone purifying means, wherein said degradation detecting means detects the degradation of said ozone purifying means according to outputs from said first and second ozone concentration detecting means and an output from said airflow detecting means.

14. The apparatus according to claim 12, further comprising an ozone supply means for supplying ozone into an airflow passing through said ozone purifying means, on an upstream side of said first ozone concentration detecting means.

15. The apparatus according to claim 13, further comprising an ozone supply means for supplying ozone into an airflow passing through said ozone purifying means, on an upstream side of said first ozone concentration detecting means.

16. The apparatus according to claim 14, further comprising an diffusion prevention pipe for preventing diffusion of ozone supplied from said ozone supply means.

17. The apparatus according to claim 16, further comprising an ozone decomposing means for decomposing ozone, said ozone decomposing means being disposed on a downstream side of said second ozone concentration detecting means.

18. The apparatus according to claim 16, further comprising a circulation diffusion prevention pipe which comprises an upstream diffusion prevention pipe disposed on an upstream side of said ozone purifying means and a downstream diffusion prevention pipe disposed on a downstream side from said ozone purifying means, said downstream diffusion prevention pipe being connected to said upstream diffusion prevention pipe.

19. The apparatus according to claim 18, wherein said circulation diffusion prevention pipe is provided with blowing means for generating an airflow, and said blowing means operates such that an airflow rate becomes a value suitable for said first and second ozone concentration detecting means to detect the ozone concentration.

20. The apparatus according to claim 16, further comprising moving means for moving said ozone concentration detecting means, said ozone supply means, and said diffusion prevention pipe to a position where none of said ozone concentration detecting means, said ozone supply means, and said diffusion prevention pipe obstruct an airflow into or from said ozone purifying means when the degradation detection is not executed.

* * * * *